(12) United States Patent
Yu et al.

(10) Patent No.: US 7,948,473 B2
(45) Date of Patent: May 24, 2011

(54) MOUSE DEVICE

(75) Inventors: Ming-Hsi Yu, Taipei (TW); Hong-Che Yen, Taipei (TW); Ming-Hsun Lu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 790 days.

(21) Appl. No.: 11/767,760

(22) Filed: Jun. 25, 2007

(65) Prior Publication Data

US 2008/0150895 A1 Jun. 26, 2008

(30) Foreign Application Priority Data

Dec. 20, 2006 (TW) ................................ 95147862 A

(51) Int. Cl.
*G06F 3/033* (2006.01)
(52) U.S. Cl. ........................................................ 345/163
(58) Field of Classification Search .................. None
See application file for complete search history.

(56) References Cited

U.S. PATENT DOCUMENTS

2007/0069088 A1* 3/2007 Bidiville et al. ........... 248/188.9
* cited by examiner

*Primary Examiner* — Bipin Shalwala
*Assistant Examiner* — Daniel Bedell
(74) *Attorney, Agent, or Firm* — Kirton & McConkie; Evan R. Witt

(57) ABSTRACT

A mouse device includes a main body and at least one mouse foot pad. The mouse foot pad is fixed on the lower surface of the main body. The mouse foot pad includes a first layer with first friction coefficient μ1 and a second layer with a second friction coefficient μ2, where the second friction coefficient μ2 is greater than the first friction coefficient μ1. The first layer and the second layer are formed as a laminate. The second layer is bonded to the lower surface of the main body. The first layer is in contact with the working plane when the mouse device is operated. When the second layer is in contact with the working plane, the user is reminded that the mouse foot pad needs to be changed.

4 Claims, 3 Drawing Sheets

US 7,948,473 B2

MOUSE DEVICE

FIELD OF THE INVENTION

The present invention relates to a mouse device, and more particularly to a mouse device having improved mouse foot pads.

BACKGROUND OF THE INVENTION

With increasing development of high technology industries, computers are widely used in our daily lives, or otherwise employed for working or amusement purposes. For controlling the computers, mice, keyboards or trackballs become essential input devices. By operating these input devices, data may be inputted into the computers. Especially, in addition to the basic functions of controlling cursor movement, the mouse device may be used to execute extended functions. For example, by operating the click buttons of the mouse device, the user may select a desired item on the function menu of the browsing frame and browse the selected web pages. Recently, online games have experienced great growth and are now rapidly gaining in popularity. The user may play the online games while frequently operating the mouse device.

When a conventional mouse device is operated, a working plane such as a desk plane or a mouse pad is required for the mouse to move thereon. If the mouse device has been used for a long term, the bottom of the mouse device and the working plane may be suffered from abrasion due to the contact of the mouse device with the working plane. Under this circumstance, the accuracy in tracking and the ease of movement for the mouse device will be impaired.

For reducing abrasion of the mouse device and the working plane, the main body of the mouse device is provided with mouse foot pads on the lower surface. Referring to FIG. 1, a conventional mouse device having mouse foot pads is schematically illustrated. As shown in FIG. 1, the main body 101 of the mouse device 100 has several mouse foot pads 103 on the lower surface 102 thereof. By means of the mouse foot pads 103, the lower surface 102 of the main body 101 will not be in direct contact with the working plane. As a consequence, both of the main body 101 of the mouse device 100 and the working plane are protected from being largely abraded. On the other hand, as the friction coefficient of the mouse foot pad 103 is increased, the mouse foot pad 103 becomes coarser and the friction between the mouse foot pads 103 and the working plane is increased. For increasing the accuracy in tracking and the ease of movement, the friction between the mouse foot pads 103 and the working plane should be reduced. In other words, it is preferred that the mouse foot pad 103 is made of a material with lower friction coefficient in order to permit smooth and slick action. By choosing a low friction-coefficient pad 103, the friction between the mouse foot pads 103 and the working plane is reduced such that the motion of the mouse device 100 is very slick.

The use of the mouse foot pads 103 may reduce abrasion of the mouse device and the working plane so as to increase the pot life of the mouse device. After a more prolonged use period, however, the mouse foot pads 103 will be abraded and removed. Under this circumstance, the mouse foot pads 103 need to be replaced with new ones. Generally, since the user seldom checks the bottom of mouse device 100, the user is unconscious of the necessity of changing the mouse foot pads 103 until the mouse device 100 gets hung up when the cursor movement on the screen is clumsy. At this moment, the lower surface of the mouse device is possibly abraded.

SUMMARY OF THE INVENTION

It is an object of the present invention to provide a mouse device having improved mouse foot pads with two layers of different materials so as to remind the user whether the mouse foot pads need to be changed.

In accordance with a first aspect of the present invention, there is provided a mouse device. The mouse device includes a main body and a mouse foot pad. The main body includes an upper surface for resting a user's palm thereon and a lower surface to be in contact with a working plane. The mouse foot pad is fixed on the lower surface of the main body. The mouse foot pad includes a first layer with first friction coefficient $\mu 1$ and a second layer with a second friction coefficient $\mu 2$, where the second friction coefficient $\mu 2$ is greater than the first friction coefficient $\mu 1$. The first layer and the second layer are formed as a laminate. The second layer is bonded to the lower surface of the main body. The first layer is in contact with the working plane when the mouse device is operated.

In an embodiment, the first layer further includes a perforation.

In an embodiment, the second layer further includes a salient portion partially embedded into the perforation of the first layer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

As previously described, the user is unconscious of the necessity of changing the mouse foot pads in the prior art. For solving the above drawbacks, the present invention provides a mouse device having improved mouse foot pads with two layers of different materials so as to remind the user whether the mouse foot pads need to be changed.

Figure 1:
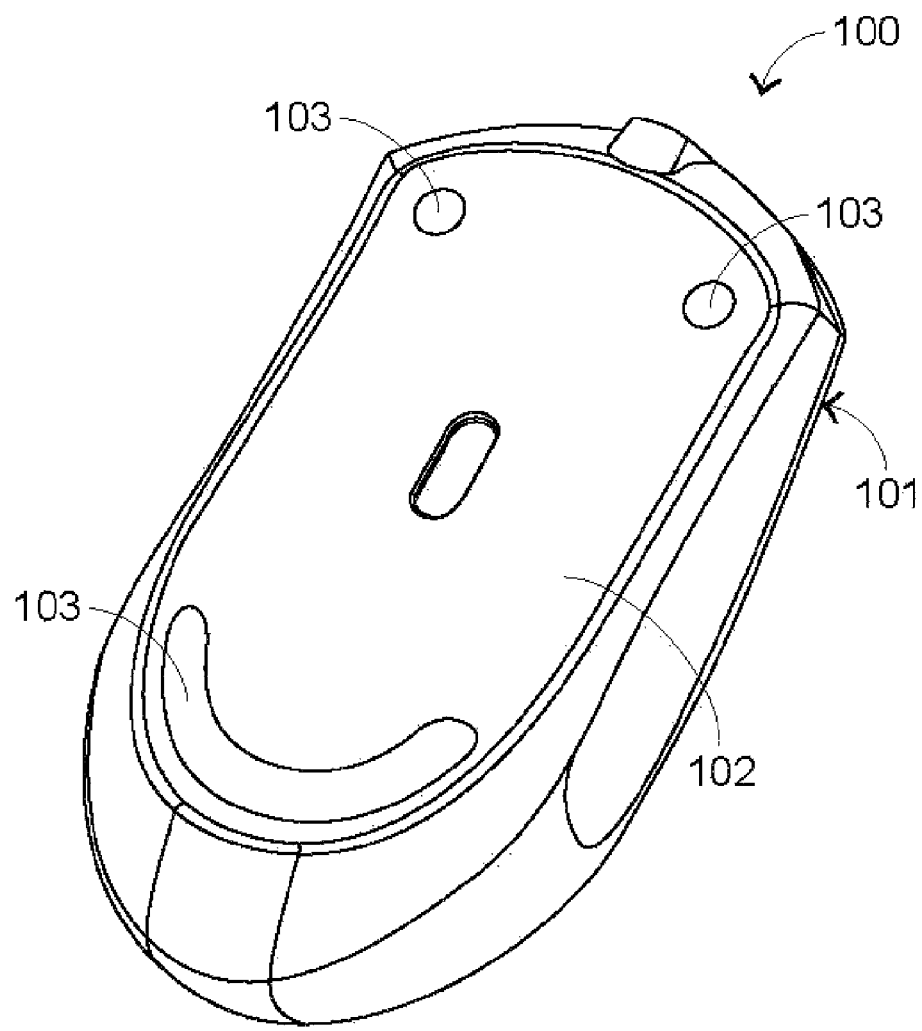
FIG. 1 is a schematic perspective view illustrating the bottom of a mouse device having mouse foot pads according to prior art.
Figure 2:
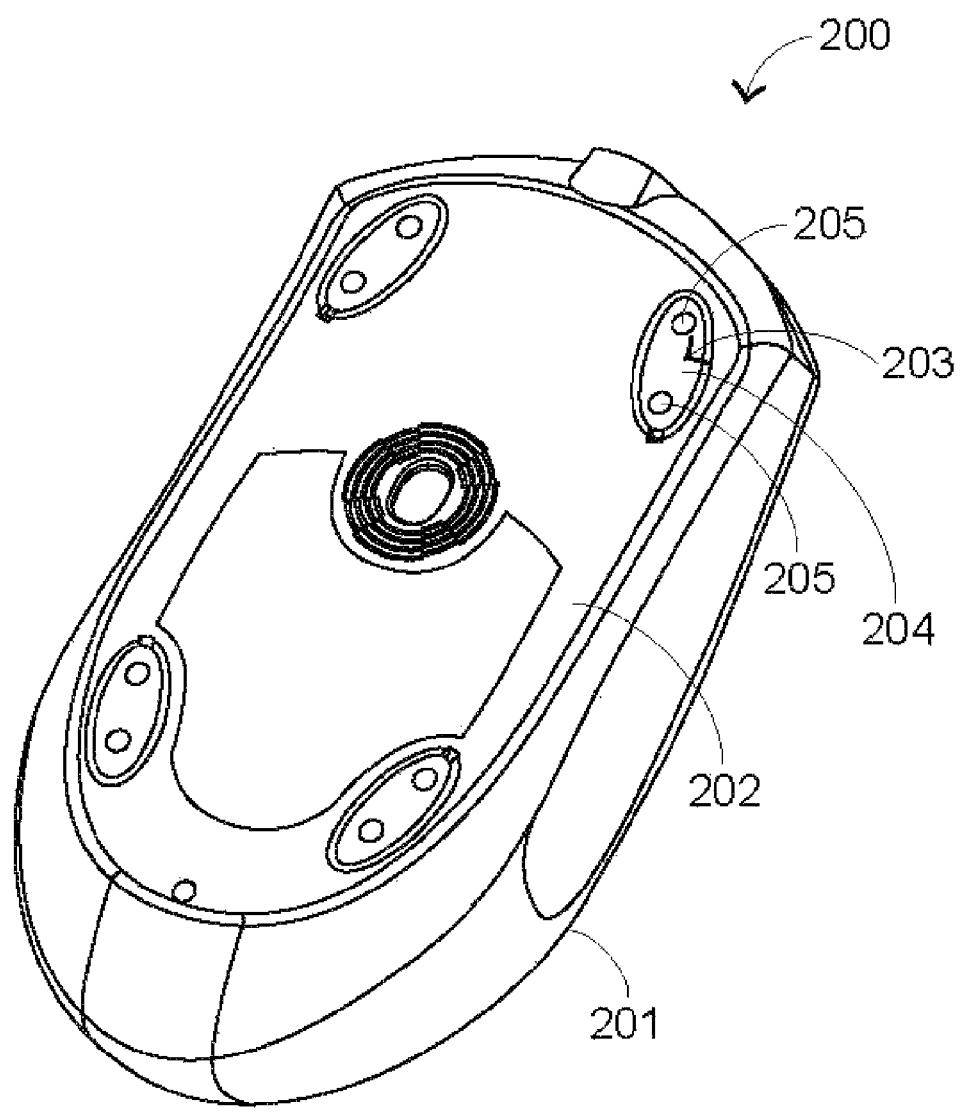
FIG. 2 is a schematic perspective view illustrating the bottom of a mouse device having mouse foot pads according to a preferred embodiment of the present invention.

Please refer to FIG. 2, which is a schematic perspective view illustrating the bottom of a mouse device according to a preferred embodiment of the present invention. Like the conventional mouse device, the main body 201 of the mouse device 200 has an upper surface (not shown) for resting the user's palm thereon. As shown in FIG. 2, the main body 201 of the mouse device 200 has several mouse foot pads 203 on the lower surface 202 thereof. The mouse foot pad 203 includes a first layer 204 and a second layer 205. The first layer 204 and the second layer 205 have a first friction coefficient $\mu 1$ and a second friction coefficient $\mu 2$, respectively. The first friction coefficient $\mu 1$ is less than the second friction coefficient $\mu 2$.

In accordance with a specific feature of the present invention, the first layer 204 and the second layer 205 are formed as a laminate, in which the second layer 205 is bonded to the lower surface 202 of the main body 201 and the first layer 204 is responsible for direct contact with a working plane. The working plane includes for example a desk plane or a mouse mat. Since the first layer 204 has the lower friction coefficient μ1, the friction between the first layer 204 and the working plane is reduced such that the motion of the mouse device 200 is very slick. As known, after a prolonged use period, the first layer 204 of the mouse foot pad 203 will be abraded and removed, and thus the second layer 205 may be in direct contact with the working plane. Since the second layer 205 has the greater friction coefficient μ2, the mouse foot pad 203 becomes coarser at this moment and the friction between the mouse foot pad 203 and the working plane is increased. When the cursor movement of the mouse device 200 on the screen becomes clumsy, the user may realize that the first layer 204 has been abraded off and the mouse foot pads need to be replaced with new ones. Even if the mouse foot pads are not instantly changed, the contact between the second layer 205 and the working plane may protect the lower surface 202 of the main body 201 from being abraded. In addition, due to the large area of the second layer 205, the accuracy in tracking and the ease of movement for the mouse device will be impaired to remind the user that the mouse foot pads need to be changed.

Hereinafter, three variants of the mouse foot pads will be illustrated with reference to FIGS. 3(a), 3(b) and 3(c).

Figure 3A:
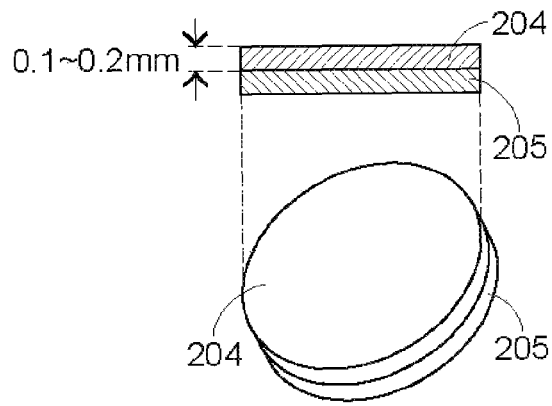
FIGS. 3(a), 3(b) and 3(c) schematically illustrate three variants of the mouse foot pads.

As shown in FIG. 3(a), the first layer 204 and the second layer 205 are formed as a laminate, in which the second layer 205 is bonded to the lower surface 202 of the main body 201 and the first layer 204 is responsible for direct contact with a working plane. In this embodiment, the mouse foot pad 203 is abraded from the perimeter to the central portion. In a case that the perimeter of the first layer 204 is abraded off and the second layer 205 is in contact with the working plane, the central portion of the first layer 204 is still remained. Meanwhile, since the contact area between the second layer 205 and the working plane is still small, the friction therebetween is not huge and thus the slick motion of the mouse device is still rendered. After an extended use period, the contact area between the second layer 205 and the working plane is increased. Due to the increased area of the second layer 205, the accuracy in tracking and the ease of movement for the mouse device will be impaired to remind the user that the mouse foot pads need to be changed.

Figure 3B:
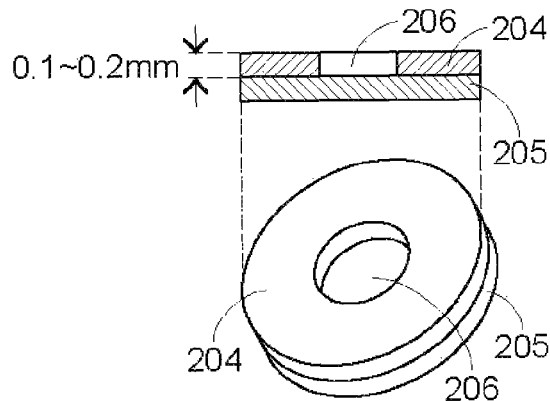

As shown in FIG. 3(b), the first layer 204 of the mouse foot pad 203 further includes a perforation 206 such that the contact area between the first layer 204 and the working plane is reduced when compared with the mouse foot pad of FIG. 3(a). In this embodiment, the mouse foot pad 203 is abraded from the outer perimeter and the inner perimeter of the first layer 204. As a consequence, the degree of abrasion for the first layer is more consistent. Once the outer perimeter and the inner perimeter of the first layer 204 are abraded off and the second layer 205 is in contact with the working plane, most of the first layer 204 is removed. Meanwhile, the contact area between the second layer 205 and the working plane is increased and the mouse foot pad 203 becomes very coarse. Under this circumstance, the accuracy in tracking and the ease of movement for the mouse device will be impaired to remind the user that the mouse foot pads need to be changed.

Figure 3C:
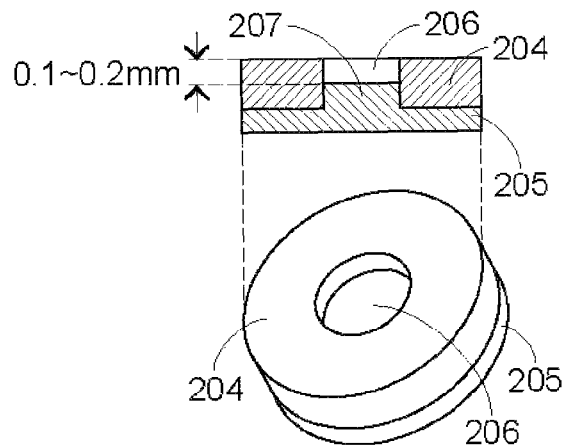

As shown in FIG. 3(c), the first layer 204 of the mouse foot pad 203 further includes a perforation 206 in the center thereof. In addition, the second layer 205 includes a salient portion 207 embedded into the perforation 206 of the first layer 204. Depending on the thickness of the salient portion 207, the pot life of the mouse foot pad 203 is adjustable. For example, for frequently changing the mouse foot pad 203, the salient portion 207 needs to be made thicker such that the time period of abrading the first layer until the salient portion 207 is exposed is shortened. Since the thickness of the salient portion 207 is adjustable, the pot life of the mouse foot pad 203 may be controlled as required.

In the above embodiments of FIGS. 3(a) and 3(b), the first layer 204 has a thickness in a range of from 0.1 mm to 0.2 mm. In the embodiment of FIG. 3(c), the thickness of the first layer 204 is adjustable according to the salient portion 207 of the second layer 205. For example, if the salient portion 207 is increased, the thickness of the first layer 204 is less than 0.2 mm. Whereas, if the salient portion 207 is decreased, the thickness of the first layer 204 may be greater than 0.2 mm.

It is noted that, however, those skilled in the art will readily observe that numerous modifications and alterations of the mouse foot pad may be made while retaining the teachings of the invention. For example, the first layer may have two or more perforations. As shown in FIG. 2, the first layer of the mouse foot pad has two perforations. Moreover, the mouse foot pad may have an arbitrary shape such as a circular shape, an elliptic shape or a rectangular shape.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device comprising:
    a main body including an upper surface for resting a user's palm thereon and a lower surface to be in contact with a working plane; and
    a mouse foot pad fixed on said lower surface of said main body to prevent said lower surface from being in direct contact with said working plane and to inhibit abrasion of said lower surface by said working plane, said mouse foot pad including a first layer with a first friction coefficient μ1 and a second layer with a second friction coefficient μ2, said second friction coefficient μ2 being greater than said first friction coefficient μ1, wherein said first layer and said second layer are formed as a laminate, said second layer is bonded to said lower surface of said main body, and said first layer is in contact with said working plane when the mouse device is operated, wherein said first layer abrades after a period of use to expose said second layer which impairs movement of said mouse device in contact with said working plane, thereby reminding said user to change said mouse foot pads, wherein said exposed second layer prevents said lower surface from being in direct contact with said working plane to inhibit abrasion of said lower surface by said working plane, and wherein said second layer further includes a salient portion partially embedded into said perforation of said first layer.

2. The mouse device according to claim 1 wherein said first layer further includes a perforation.

3. The mouse device according to claim 1 wherein said first layer has a thickness in a range from 0.1 mm to 0.2 mm.

4. The mouse device according to claim 1 wherein said first layer further includes two or more perforations.

* * * * *